United States Patent Office.

JOHAN WOLFGANG MORGENEIER, OF SHEBOYGAN, WISCONSIN.

Letters Patent No. 109,833, dated December 6, 1870.

IMPROVEMENT IN VARNISHES FOR COATING PHOTOGRAPHIC NEGATIVES.

The Schedule referred to in these Letters Patent and making part of the same.

*To whom it may concern:*

Be it known that I, JOHAN WOLFGANG MORGENEIER, of Sheboygan, in the county of Sheboygan and State of Wisconsin, have invented a new and useful Improvement in a Retouching Varnish for Producing a Ground Surface on Photographic Negatives; and I do declare that the following is a true and accurate description thereof.

The nature of this invention relates to the production of a dead, lusterless surface on solar and contact negatives to facilitate retouching either with lead-pencils or water-colors, by coating the same with a varnish composed of the ingredients, and in or about the proportions hereinafter set forth.

For this purpose I compound two solutions, the following being the formula for their preparation:

No. 1. Dissolve in two and two-third ounces absolute alcohol, ninety-five per cent. by fluid measure, one-half ounce gum sandarak, (picked,) by weight; one and one-half dram Venetian turpentine, by weight; one dram oil of lavender, by weight.

No. 2. Dissolve in five and one-half drams absolute alcohol, ninety-five per cent., fluid measure, one and one-third dram concentrated sulphuric ether, fluid measure; one and one-third dram gum camphor, by weight; two and two-third drams pure rain-water, fluid measure.

Mix the two solutions together by thoroughly shaking them; let the varnish thus made stand a day or two, when it is ready for use, when it may be applied to a contact plate in the same manner as collodion in the ordinary wet-process. After the negative is developed, intensified, fixed with cyanide of potassium, washed and dried, the plate is coated with the varnish, drained, and set to dry in a cool current of air. When dry it will present a hard, dead, and lusterless surface, resembling ground glass, which can be retouched and worked with great ease and celerity with any grade of pencil from one to five, (Faber,) or with water-colors, by stippling or otherwise.

In varnishing solar negatives, let the plate drain well, and lie with the varnish side upward, on a perfect lever, to avoid streaks. The film on solar negatives does not lengthen the time required for printing.

The photographer should observe the following rules to produce the best results:

Use no other intensifier than pyrogallic acid, and do not intensify too much, as the negative is intensified to a certain extent by the varnish.

In extremely hot, cold, or damp weather the varnished plate, when dry, may appear spotted; by varnishing it again the spots will disappear.

If necessary to use the plate immediately, allow the varnish to set a few minutes after drawing the plate, and then dry over a moderate heat; but, in all cases, the plate must be cool when the varnish is applied.

If the negative has been touched too intensely, the work can be removed without injury to the film by using a soft, round camel-hair brush dipped in water.

This varnish will not crack or peel in the hottest weather, nor will the paper stick to the plate.

What I claim as my invention, and desire to secure by Letters Patent, is—

The varnish for coating photographic negatives, composed of the ingredients, and in or about the proportions herein set forth.

JOHAN WOLFGANG MORGENEIER.

Witnesses:
ANTON HAMMER,
J. ULEIS ROFFT,
M. STEWART.